United States Patent
Dubois et al.

(10) Patent No.: US 12,156,583 B1
(45) Date of Patent: Dec. 3, 2024

(54) HINGE HAVING DUAL PIVOT AXES

(71) Applicant: Each Jewels LLC, New York, NY (US)

(72) Inventors: Abigail L. Dubois, Danbury, CT (US); Lawrence H. Dubois, Danbury, CT (US)

(73) Assignee: Each Jewels LLC, New York, NY (US)

( * ) Notice: Subject to any disclaimer, the term of this patent is extended or adjusted under 35 U.S.C. 154(b) by 0 days.

(21) Appl. No.: 18/677,686

(22) Filed: May 29, 2024

Related U.S. Application Data

(62) Division of application No. 18/231,744, filed on Aug. 8, 2023, now Pat. No. 12,004,633.

(51) Int. Cl.
| | |
|---|---|
| *E05F 1/08* | (2006.01) |
| *A45D 8/20* | (2006.01) |
| *E05D 3/06* | (2006.01) |
| *E05F 1/12* | (2006.01) |
| *F16C 11/04* | (2006.01) |

(52) U.S. Cl.
CPC ............... *A45D 8/20* (2013.01); *E05D 3/06* (2013.01); *E05F 1/1207* (2013.01); *E05F 1/1253* (2013.01); *F16C 11/04* (2013.01); *E05Y 2900/132* (2013.01); *E05Y 2900/20* (2013.01); *E05Y 2999/00* (2024.05)

(58) Field of Classification Search
None
See application file for complete search history.

(56) References Cited

U.S. PATENT DOCUMENTS

| | | | | |
|---|---|---|---|---|
| 378,861 | A * | 3/1888 | Atwood | E05D 3/12 16/366 |
| 824,923 | A * | 7/1906 | Falkenrath | E05D 3/00 16/283 |
| 984,926 | A * | 2/1911 | Katzenberger | E05D 3/00 16/283 |
| 1,031,745 | A * | 7/1912 | Unckrich | E05D 3/12 16/366 |

(Continued)

FOREIGN PATENT DOCUMENTS

| | | | | |
|---|---|---|---|---|
| CN | 109914955 | A * | 6/2019 | |
| CN | 216949963 | U * | 7/2022 | E05D 11/04 |

(Continued)

*Primary Examiner* — Chuck Y Mah
(74) *Attorney, Agent, or Firm* — Brian Beverly; Beeson Skinner Beverly, LLP

(57) ABSTRACT

A hinge having dual axes includes two hinge members each having a hinge leaf and one or more knuckles, a pivot pin received in a longitudinally extending bore in each knuckle, each pivot pin also received in one of two apertures in one or more connector plates that interconnect the hinge members, and one or more springs biasing the hinge members toward a closed position, so that the knuckles are rotatably disposed adjacent to each other, each hinge member independently rotatable about one of two pivot axes, and only a single seam is presented between the two knuckles as the hinge members move between open and closed configurations. In one embodiment a connector incorporating the connecting plates covers and hides the springs from view.

12 Claims, 25 Drawing Sheets

(56) References Cited

U.S. PATENT DOCUMENTS

| | | | | |
|---|---|---|---|---|
| 1,659,928 A | * | 2/1928 | Townsend | E05D 3/12 |
| | | | | 16/366 |
| 3,183,548 A | * | 5/1965 | Speakman | E05D 3/12 |
| | | | | 244/129.5 |
| 3,191,218 A | * | 6/1965 | Skiba | E05D 3/12 |
| | | | | 105/422 |
| 4,443,911 A | * | 4/1984 | Bannister | E04B 2/7431 |
| | | | | 52/239 |
| 5,493,760 A | * | 2/1996 | Takimoto | E05D 3/12 |
| | | | | 16/376 |
| 5,561,887 A | * | 10/1996 | Neag | E05D 3/127 |
| | | | | 16/334 |
| 6,256,839 B1 | * | 7/2001 | Wu | E05F 1/1215 |
| | | | | 16/302 |
| 6,899,013 B2 | * | 5/2005 | Ebbing | F04B 27/1072 |
| | | | | 74/60 |
| 8,745,824 B2 | * | 6/2014 | Holstensson | E05D 7/1011 |
| | | | | 16/259 |
| 2003/0101539 A1 | * | 6/2003 | Fang | E05D 3/08 |
| | | | | 16/302 |
| 2004/0020011 A1 | * | 2/2004 | Fang | E05F 1/1215 |
| | | | | 16/302 |
| 2017/0336835 A1 | * | 11/2017 | Lin | G06F 1/1681 |
| 2020/0190881 A1 | * | 6/2020 | Wu | E05F 1/1025 |

FOREIGN PATENT DOCUMENTS

| | | | |
|---|---|---|---|
| CN | 217652550 U | * | 10/2022 |
| GB | 789980 A | * | 4/1958 |

\* cited by examiner

US 12,156,583 B1

HINGE HAVING DUAL PIVOT AXES

CROSS-REFERENCE TO RELATED APPLICATIONS

This is a divisional application of application Ser. No. 18/231,744, filed Aug. 8, 2023.

BACKGROUND

Technical Field

The present invention relates generally to hinges and more particularly relates to hinges having dual pivot axes, some embodiments of which are spring biased or which hide the hinge knuckles from view and create a single visible seam between two adjoining hinge leaves.

Description of Related Art

In many hinge mechanisms and applications (for example, hair accessories, jewelry, foldable electronics, cabinetry), it is desirable to have a single external seam with no visible knuckles present. This may be accomplished with a plurality of approximately parallel pins. In addition, some applications require the two leaves of the hinge to move independently. Other applications require a large range of motion (>180°). Still other applications require a spring mechanism to return the leaves to their original positions. Previous inventions do not address all these issues.

SUMMARY OF THE INVENTION

The invention disclosed herein relates to a functional hinge with only a singular seam between the leaves that is readily visible from the exterior portion. The hinge may open more than 180° and no visible knuckles are required (although they are not precluded). This is accomplished by using one or more pairs of approximately parallel pins. There is a supplementary interior piece, which guides the rotational axis. This can be an additional body member, one or more springs, or a combination of body member(s) and spring(s) that allows the leaves to readily open and close back to their original state. Importantly, the leaves are not coupled and may move independently (although coupling is not precluded in the present invention). One or more springs may be used to provide tension to the hinge assembly and return the leaves toward their original positions.

DETAILED DESCRIPTION OF THE ILLUSTRATED EMBODIMENT

Figure 1A:
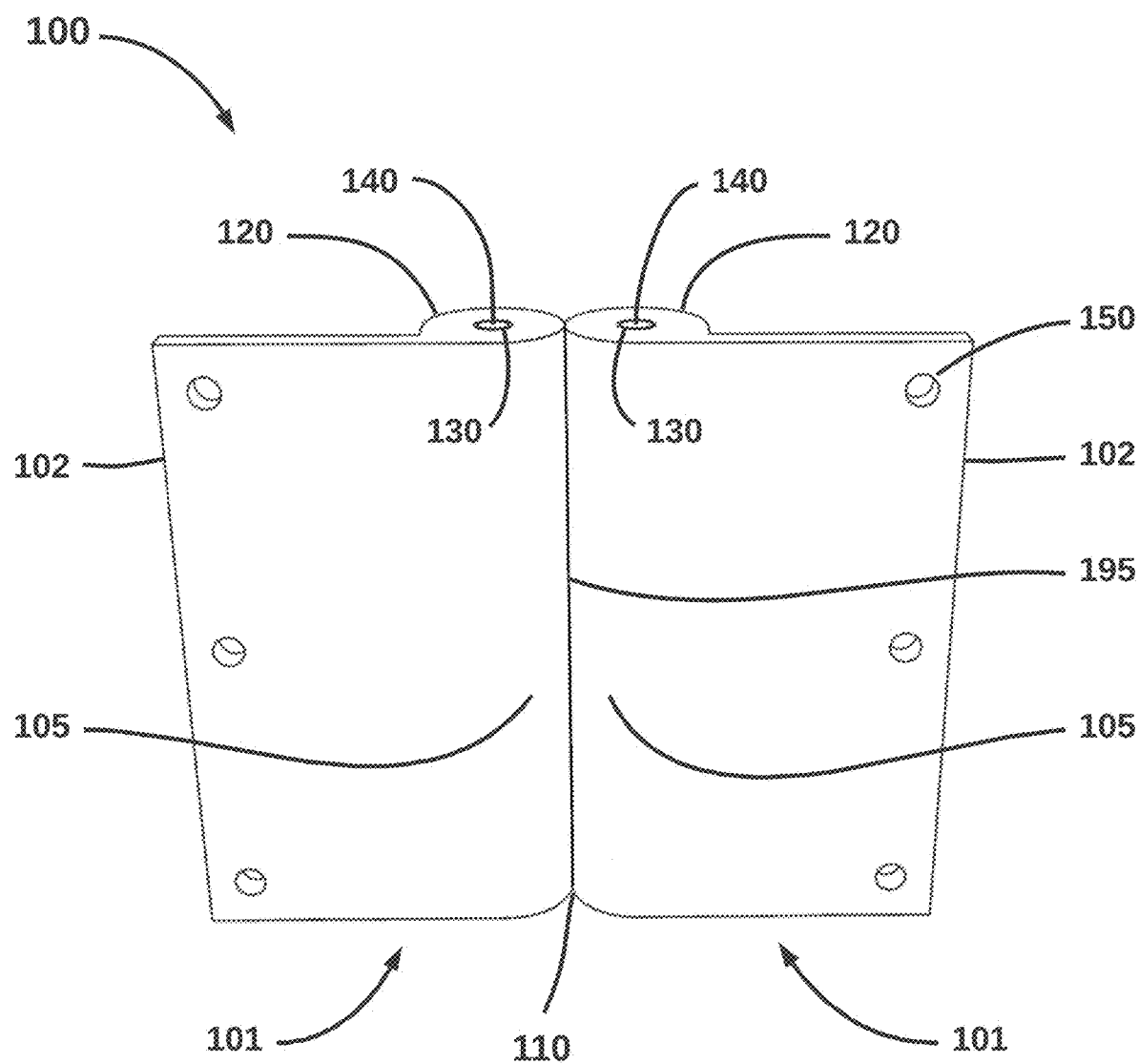
FIG. 1A is an upper front perspective view of a hinge having dual pivot axes according to the invention shown in a closed configuration.

A hinge having dual pivot axes according to the invention is now described with respect to the accompanying illustrations. A hinge having dual pivot axes, referred to generally at 100 in FIGS. 1A and 1B, includes two hinge members 101, each hinge member having one or more knuckles 120 extending along an inner edge 105 of the hinge member, and a hinge leaf 102 having mounting holes 150 for attaching the hinge leaf 102 to a support structure. The knuckles are typically semicircular, but this is not a requirement—other curved shapes such as portions of parabolas, ellipses, catenaries, etc. may be envisioned—essentially any shape which allows the leaves to rotate with respect to each other. A center bore 130 extends axially through each knuckle for receiving a pivot pin 140. In the illustrated embodiment, each hinge member 100 includes two knuckles 120 but one or more than two knuckles are within the ambit of the invention. As seen in FIGS. 1C and 1E, two pivot pins 140, generally but not necessarily in parallel relation, are received in the center bores 130 of the knuckles 120 forming spaced apart pivot axes about which the hinge members 100 move independently of each other. The spacing of the pivot axes allows the hinge members 100 to open more than 180°.

The hinge includes two springs 160 and a coupler 170. As seen in FIG. 1D, the coupler 170 includes two connector plates 171 and a coupler body 172 extending between the connector plates. In the illustrated embodiment, the coupler body 172 has a back wall 173 and two side walls 174 that combine to form an interior cavity 175. The coupler body 172 could, however, be cylindrical or any shape that defines an interior cavity. It can be seen that in the assembled configuration shown in FIG. 1C the springs 160 are hidden by the coupler 170 providing an aesthetic advantage over prior art hinges that show their inner workings.

Each of the connector plates 171 of the coupler has two spaced apart apertures 190 in which are received the two pivot pins 140. The connector plates 171 thus interconnecting the pins 140 and hence the hinge members 100.

The helical coil of the two springs 160 defines a center bore 141, a first end 161 and a second end 162. Each spring 160 is retained by one of the two pivot pins 140. In the illustrated embodiment, the spring is also axially retained between two of the knuckles 120. One end 161 of the spring 160 is biased against the hinge leaf 101 of one of the hinges 100 and the other end is captured in a hole 180 in the back wall 173 of the coupler 170 and hence biased against the coupler 170 so that the hinge leaves are biased from an open configuration, such as shown in FIGS. 1B and 1C, to a closed configuration as shown in FIG. 1A.

Figure 1B:
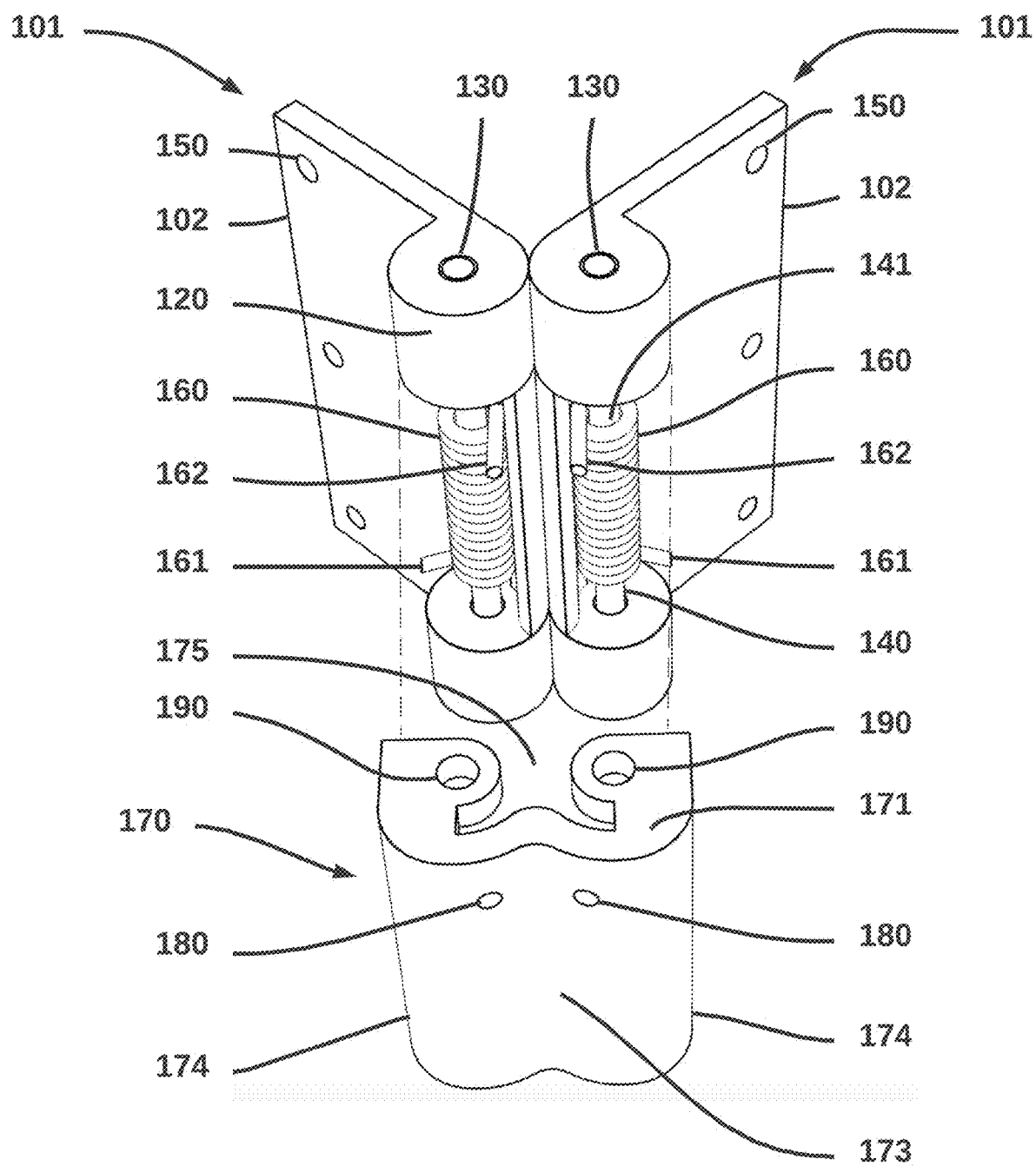
FIG. 1B is an exploded upper rear perspective view thereof shown in a partially open configuration.
Figure 1C:
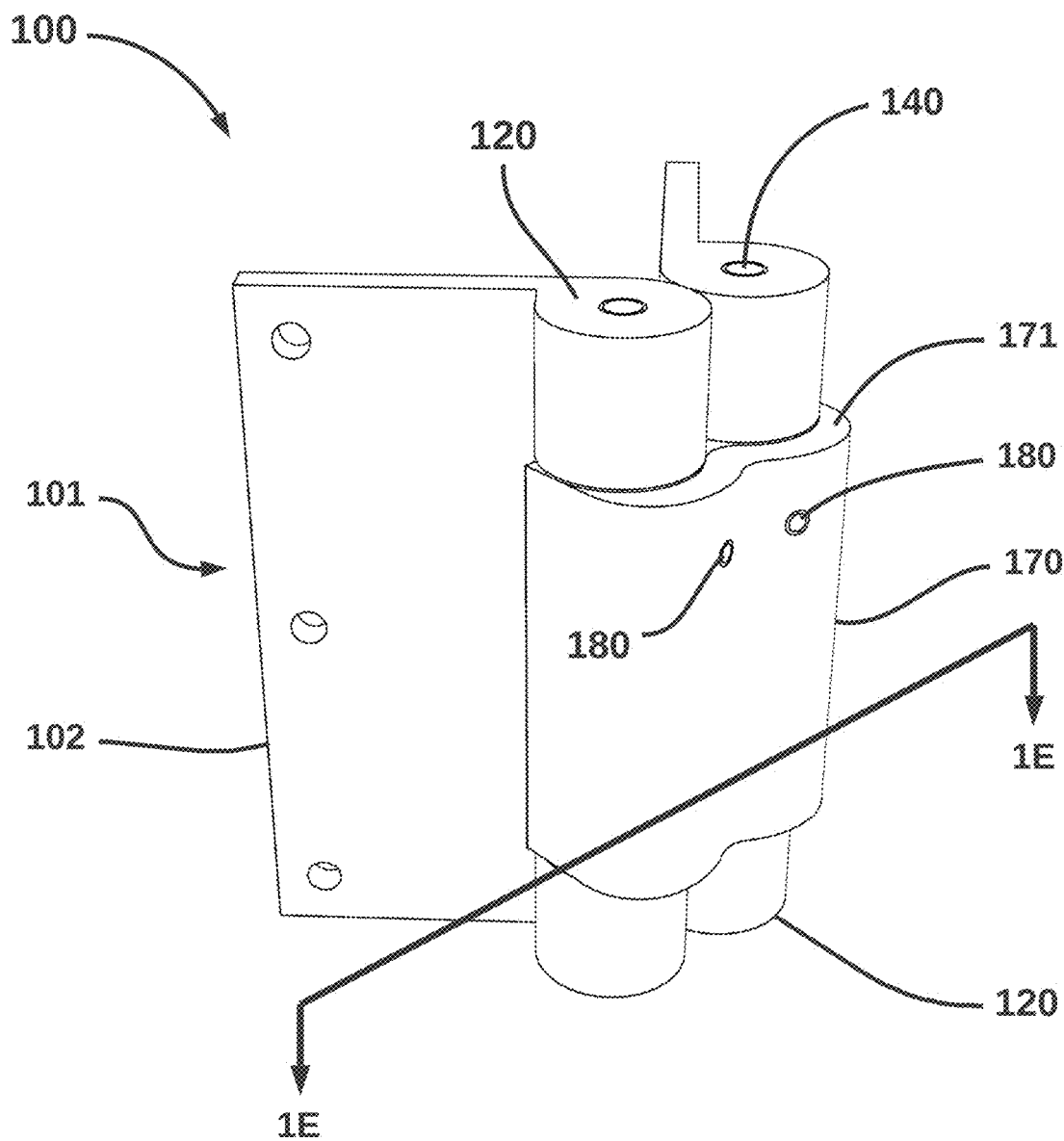
FIG. 1C is an upper left rear perspective view thereof showing the hinge in an assembled partially open configuration.
Figure 1D:
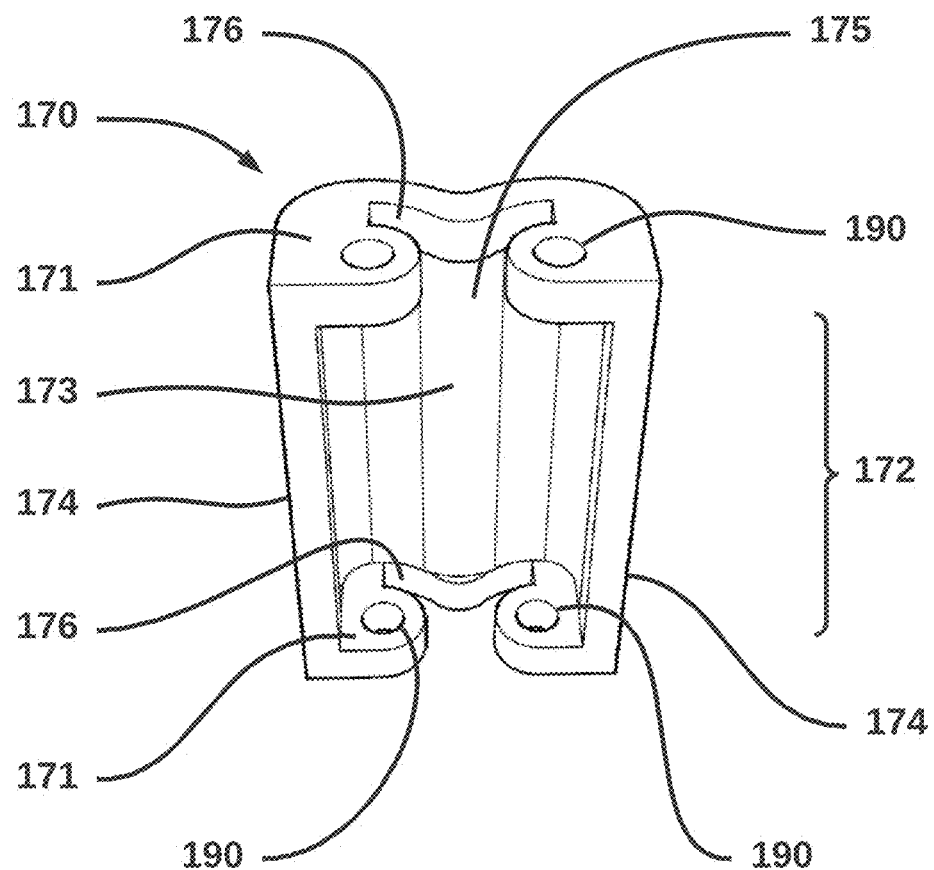
FIG. 1D is an upper front view of a connector according to the invention.
Figure 1E:
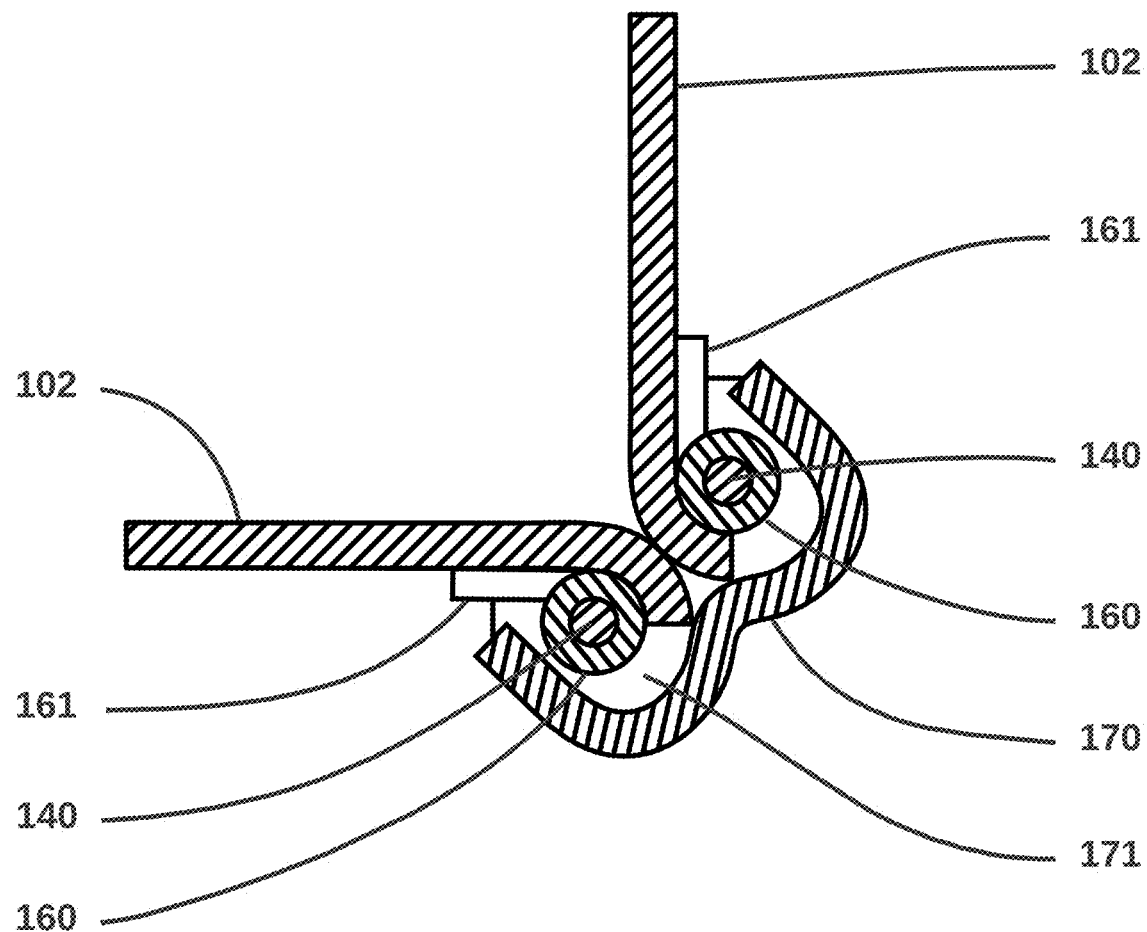
FIG. 1E is a sectional view taken along lines 1E-1E of FIG. 1C.
Figure 1F:
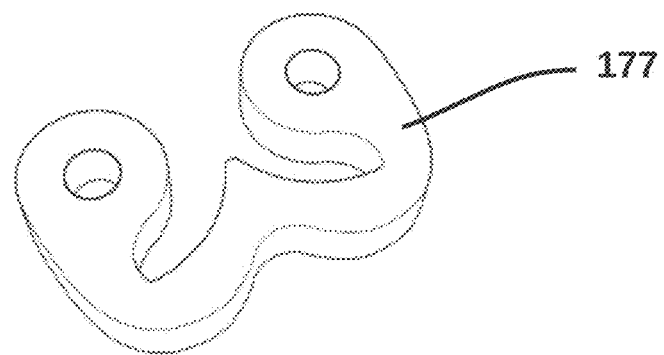
FIGS. 1F and 1G are upper left perspective and plan views of a connector plate according to the invention.
Figure 1G:
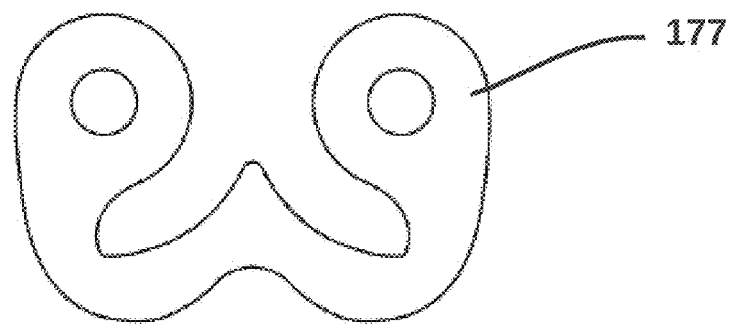
Figure 5A:
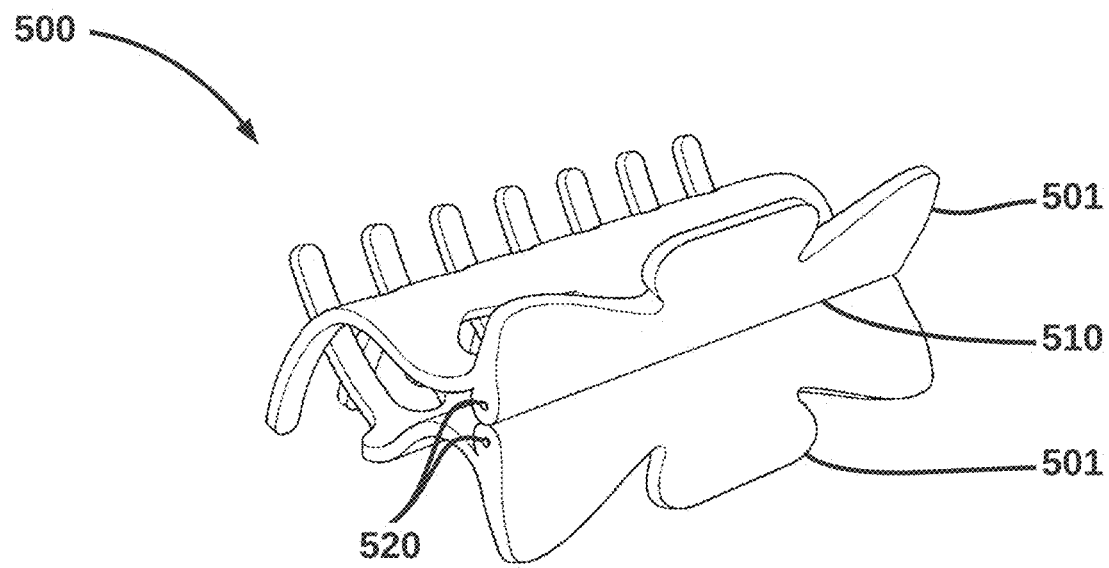
FIG. 5A is an upper left rear perspective view of a hair clip using a dual axis hinge according to the invention.
Figure 5B:
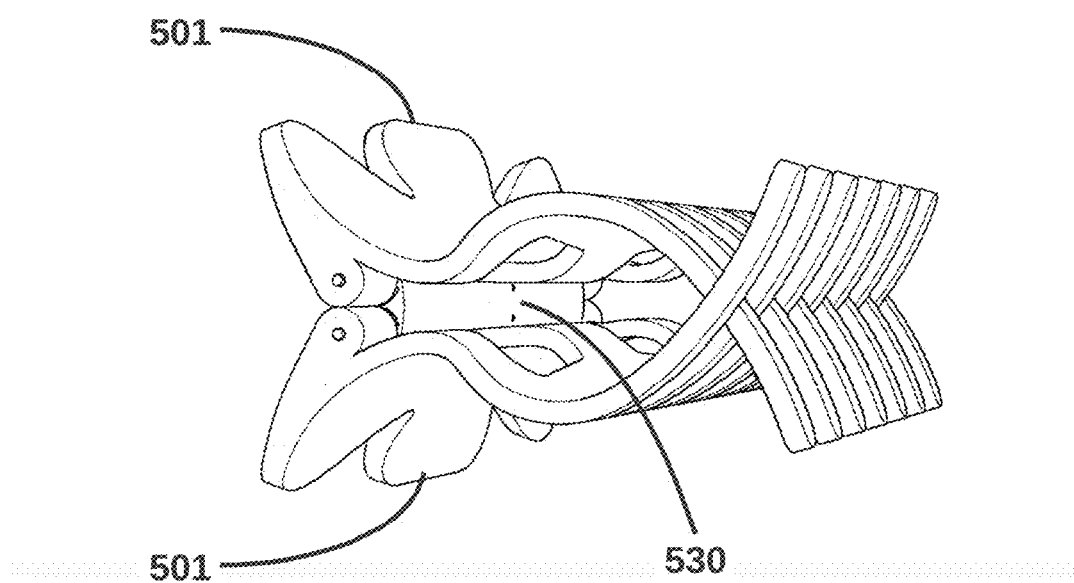
FIG. 5B is right side perspective view thereof.

A singular advantage of a hinge having dual pivot axes as described above is that the inner edges 105 of the hinge members 101 are abutting or disposed in immediate adjacency to form a single seam 195 as best seen in the front view of the hinge shown in FIG. 1A. Any structural connection between the hinge leaves is substantially or completely hidden behind the knuckles 120 when viewed from the front because the knuckles are so close together, and the coupler 172, particularly the back wall 173 thereof, is disposed rearward of the knuckles. The inner workings of the hinge are also hidden from view by coupler 170 from the rear view shown in FIG. 1B. Hiding the spring or other biasing means of the hinge provides a distinct aesthetic advantage over prior art hinges, such as those used for hair clips as shown in FIGS. 5A and 5B. However, it will be understood that in some embodiments of the invention, such as shown in FIGS. 1F and 1G, only independent connector plates 177 need be present since the coupler body 172 is optional.

In one aspect of the invention, knuckles 120 and the inner edges 105 of each of the hinge members 100 have an arced shape, as best seen in FIG. 1E, that causes them to remain at the same spacing from their counterparts on the other hinge member at all points of rotation of the hinge members. In one embodiment of the invention, the connector plates 171 of the coupler 170 include an arcuate recess 176 that receives the arched inner edges 105 of the hinge members as they pivot.

Figure 2A:
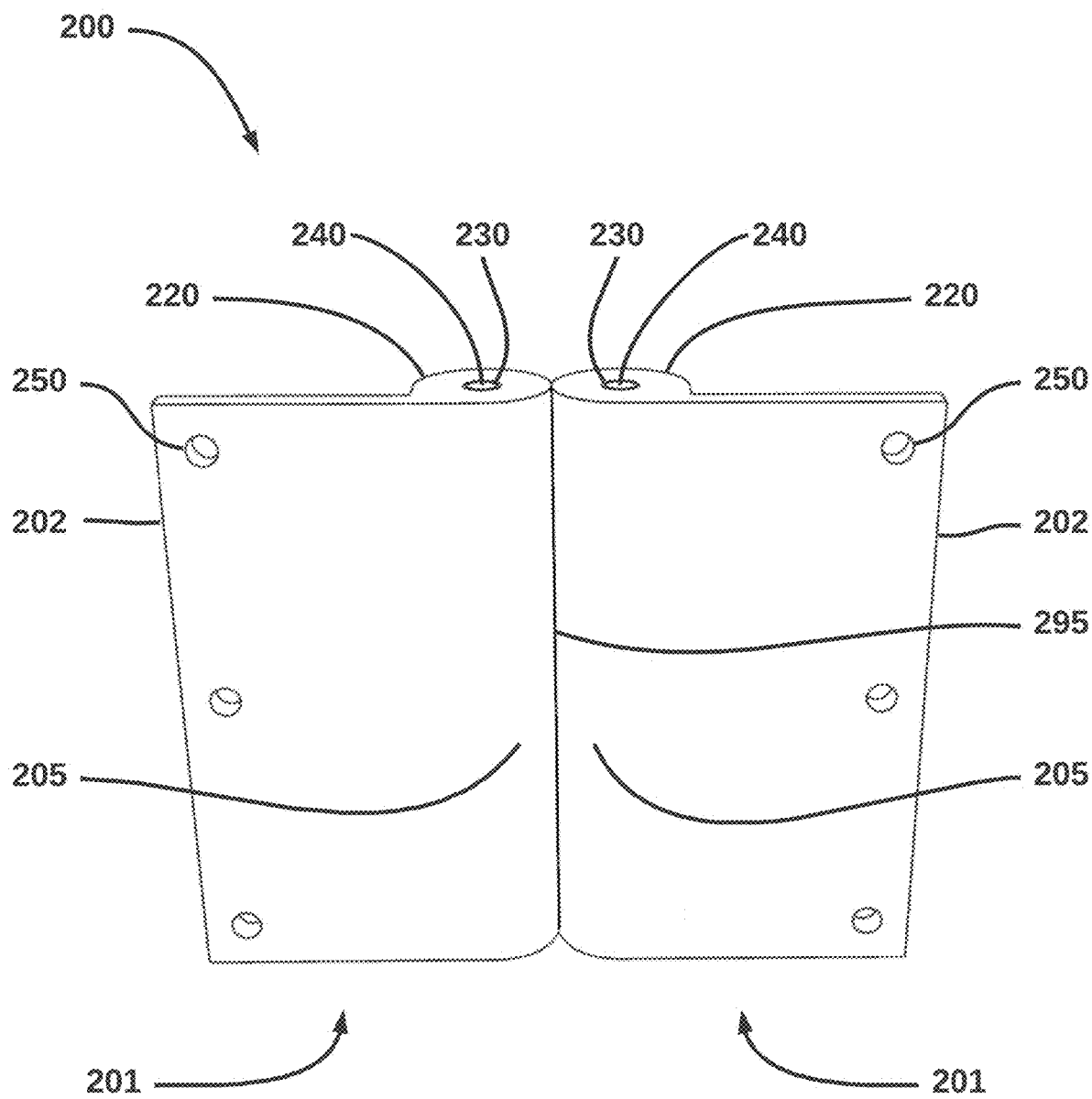
FIG. 2A is an upper front perspective view of a second embodiment of a hinge having dual pivot axes according to the invention shown in a closed configuration.
Figure 2B:
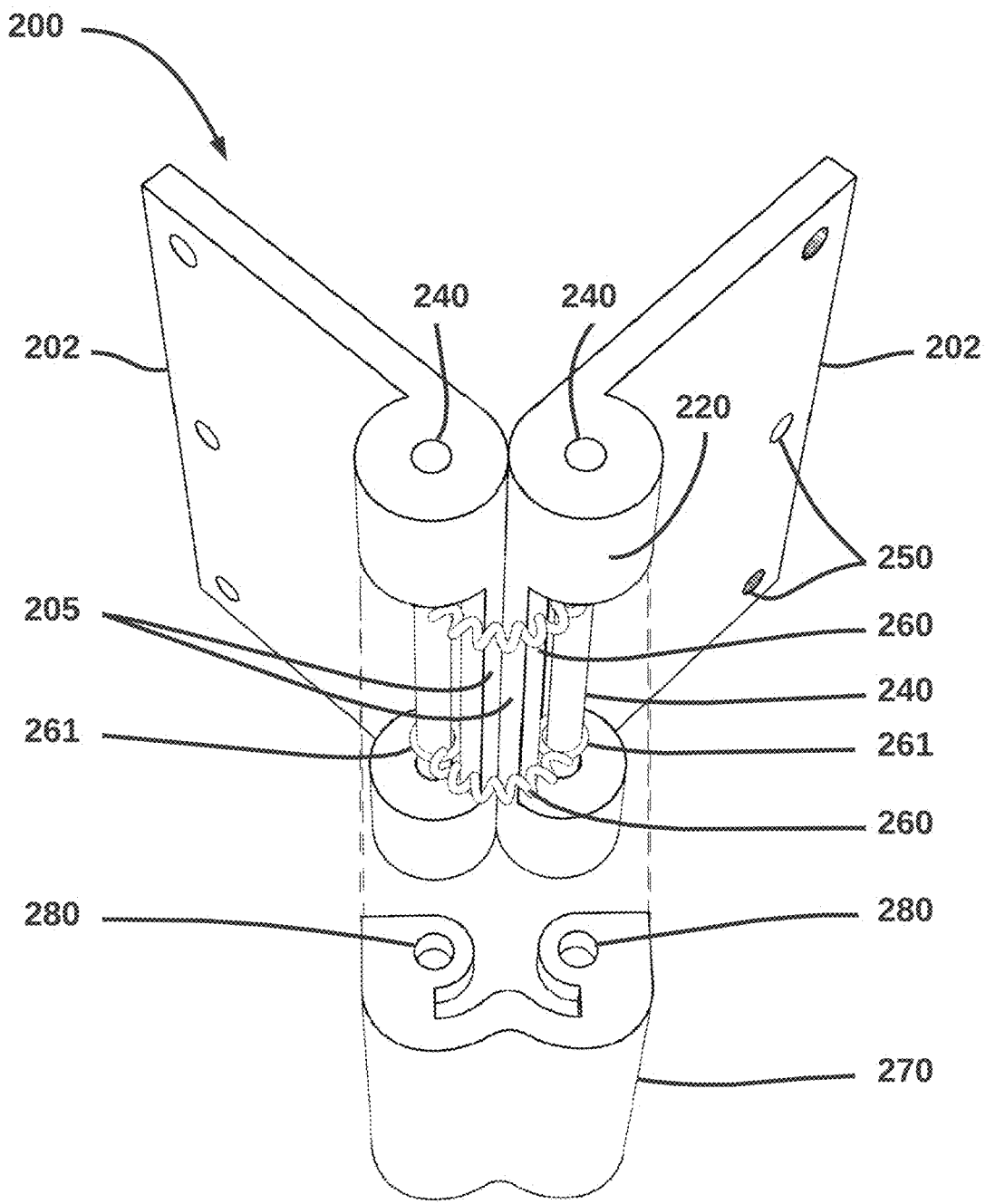
FIG. 2B is an exploded upper rear perspective view thereof shown in a partially open configuration.

A second embodiment of a hinge having dual pivot axes 200 is shown in FIGS. 2A-2D. As seen in FIGS. 2A and 2B, each of the two hinge members 201 has similar parts as in the first embodiment discussed above including hinge leaves 202, knuckles 220, center bores 230, pivot pins 240, mounting holes 250, and a coupler 270 having pivot pin-receiving apertures 280 but has different springs 260. Each end 261 of the springs 260 is attached to one of the pivot pins 240. As the hinge members 200 pivot from the closed configuration seen in FIG. 2A to the open configuration seen in FIG. 2B, the inner edges 205 thereof come into contact with the springs 260 and stretch them thus biasing the hinge members 201 toward the closed configuration.

Figure 2C:
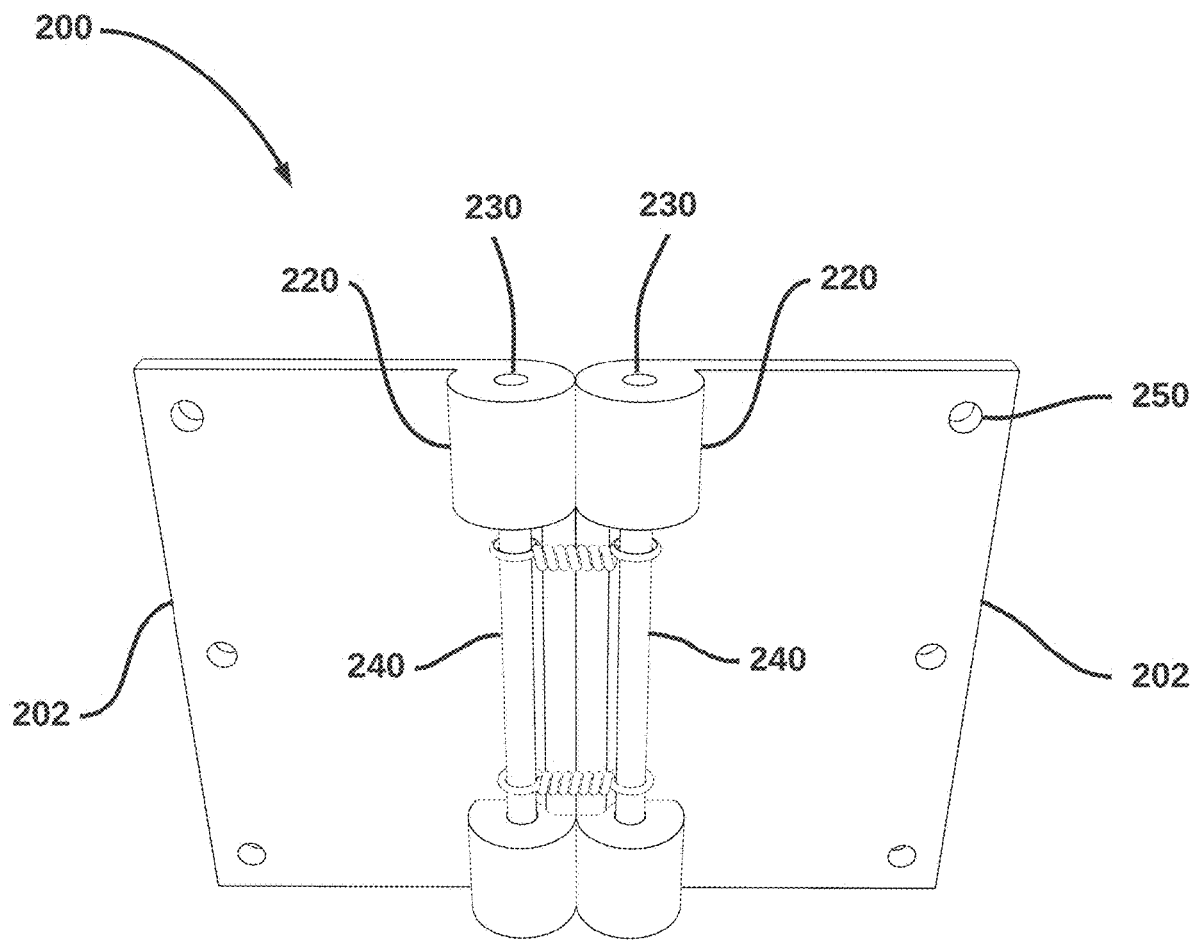
FIG. 2C is an upper left perspective rear view thereof showing the hinge assembled and in a closed configuration.
Figure 2D:
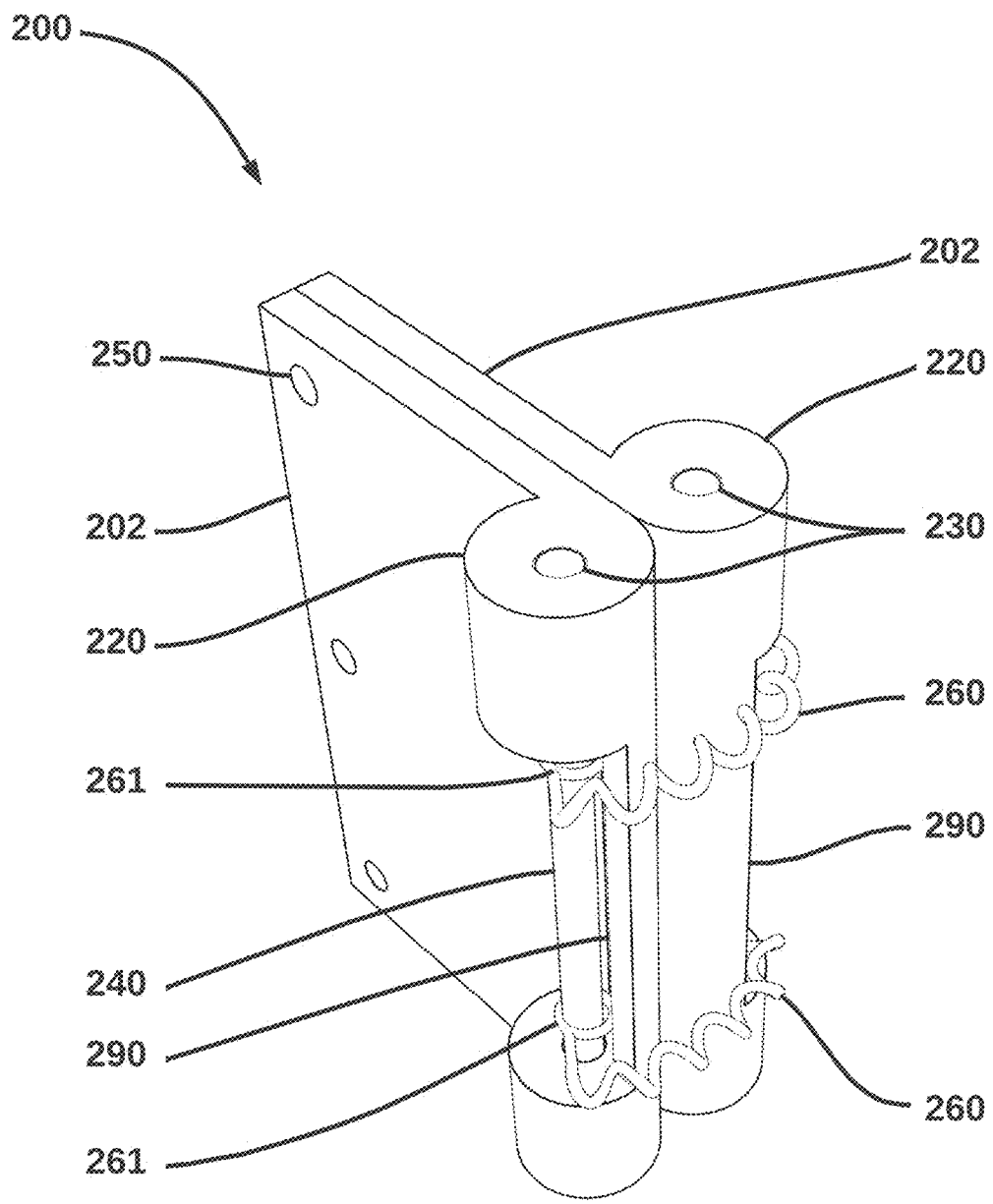
FIG. 2D is an upper left perspective rear view thereof showing the hinge assembled in an open configuration.
Figure 2E:
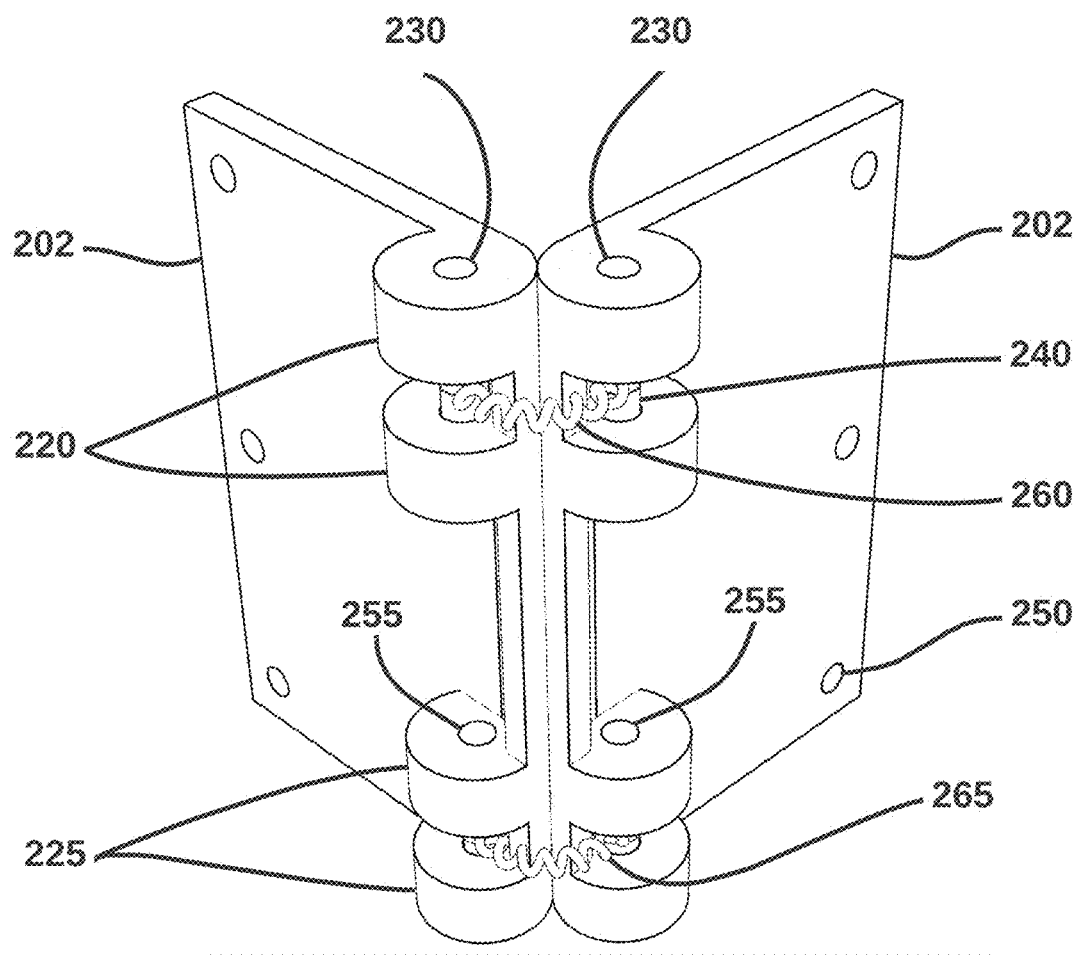
FIG. 2E is an upper rear perspective view of a third embodiment of the hinge similar to that shown in FIGS. 2A-2C shown in a partially open configuration.

A third embodiment of the invention shown in FIG. 2C, similar to the second embodiment shown in FIGS. 2A-2B, includes dual upper knuckles 220 having pivot pin-receiving apertures 230 and dual lower knuckles 225 having pivot pin-receiving apertures 255. An upper pivot pin 240 in upper knuckles 220 retains spring 260 and a lower pivot pin (not illustrated) in knuckles 225 retains spring 265.

Figure 3A:
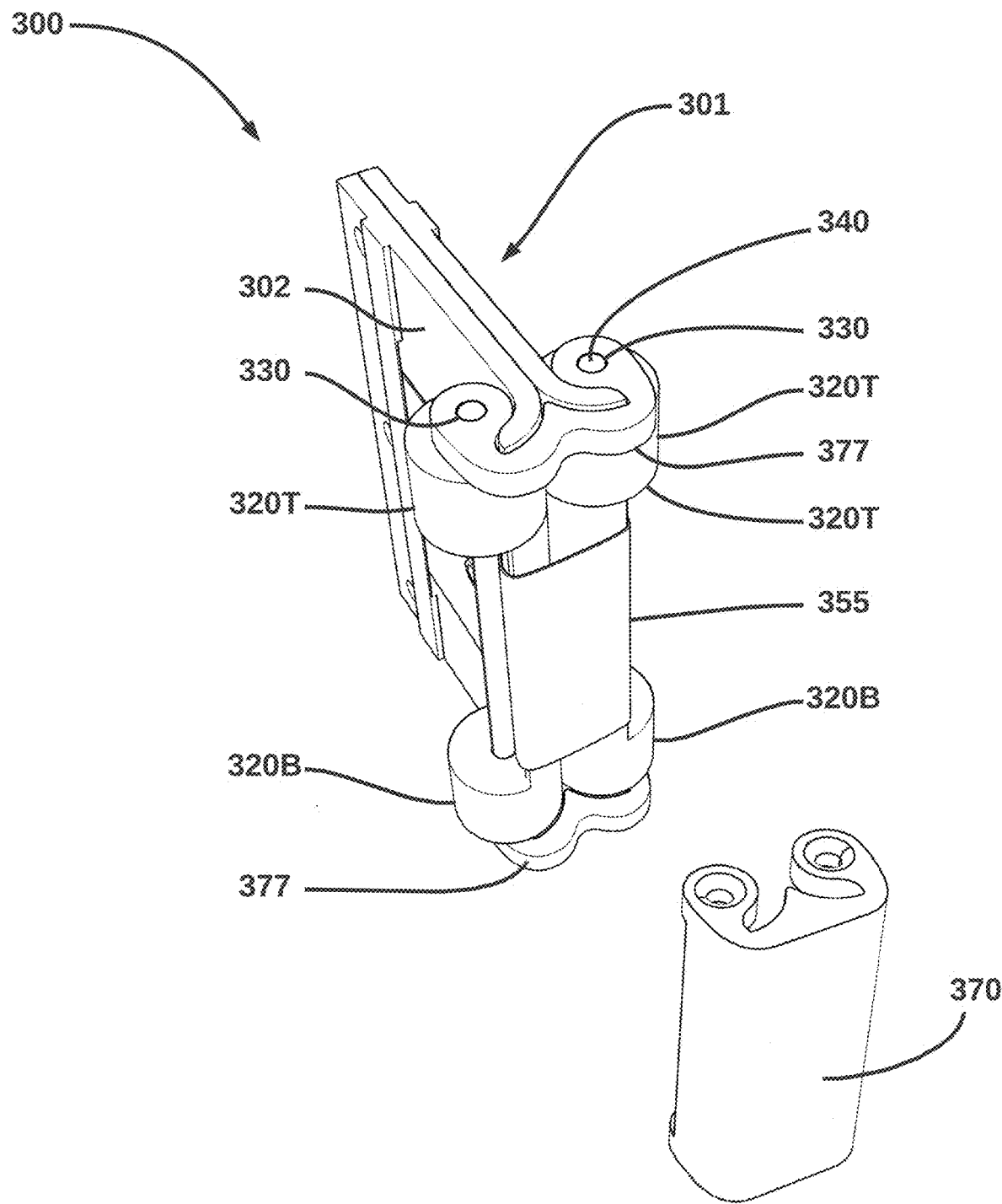
FIG. 3A is an upper front perspective view of a fourth embodiment of a hinge having dual pivot axes according to the invention shown in an open configuration.
Figure 3B:
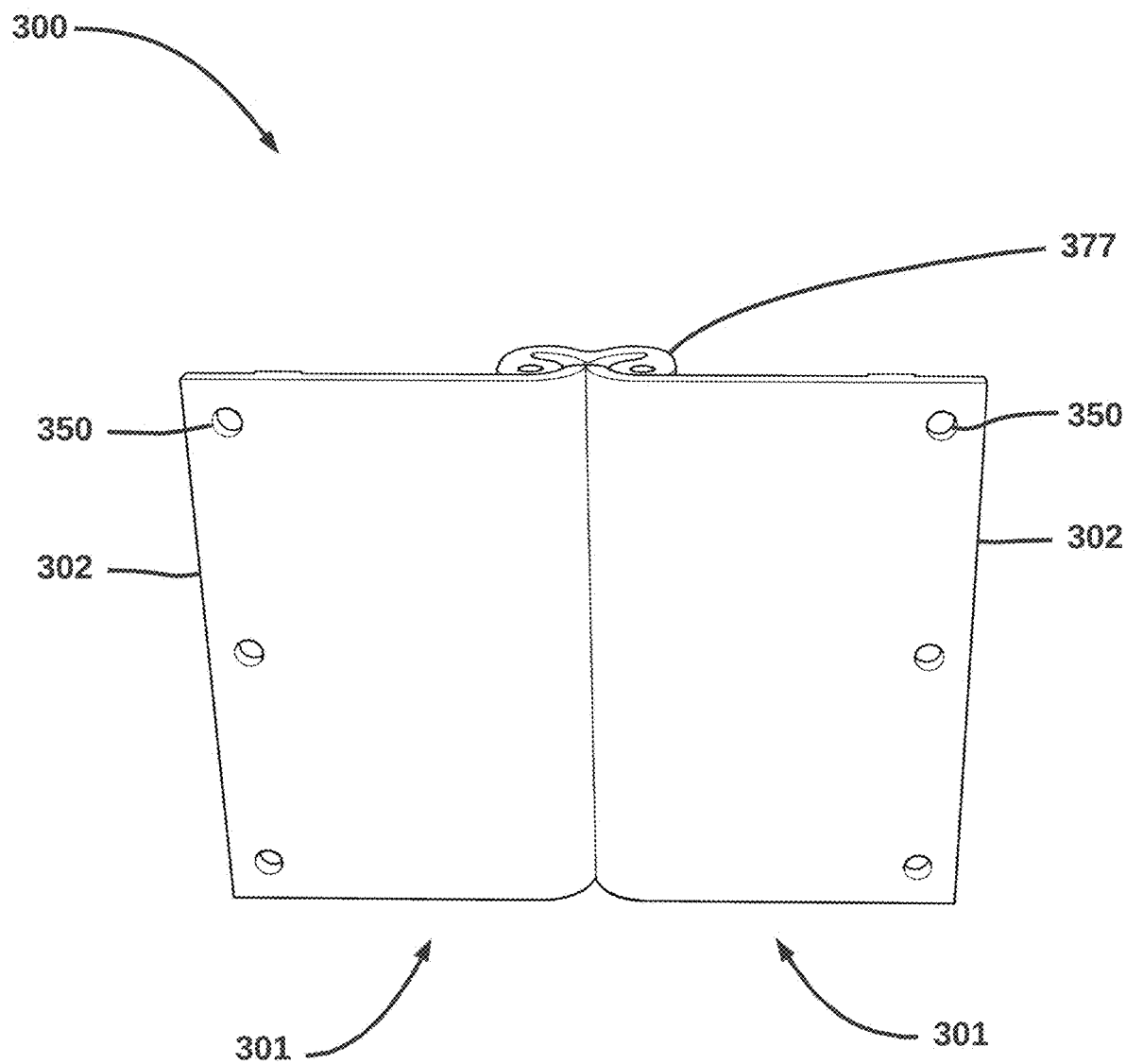
FIG. 3B is an upper rear perspective view thereof shown in a closed configuration.
Figure 3C:
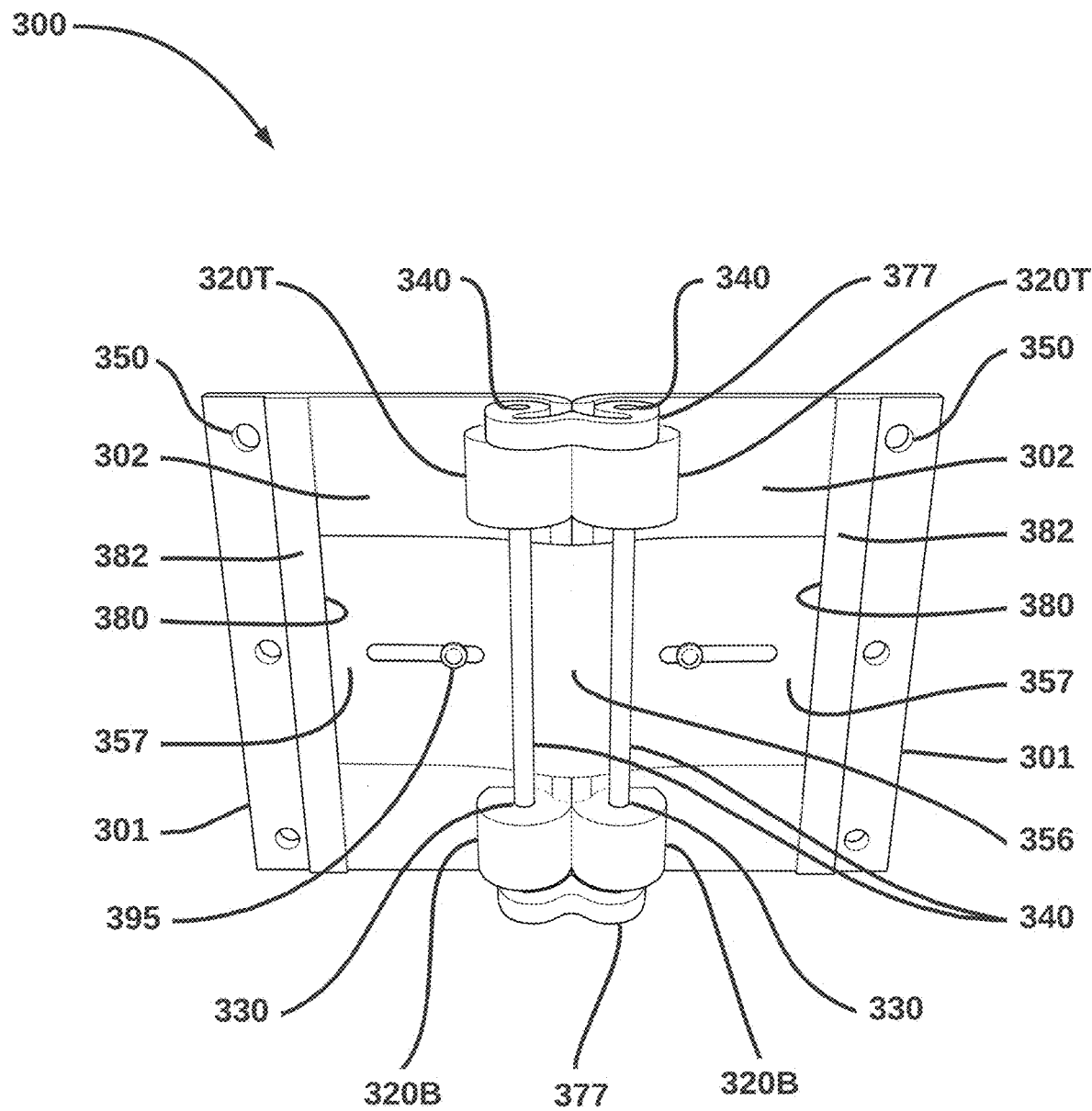
FIG. 3C is an exploded upper left perspective rear view thereof shown in a closed configuration.
Figure 3D:
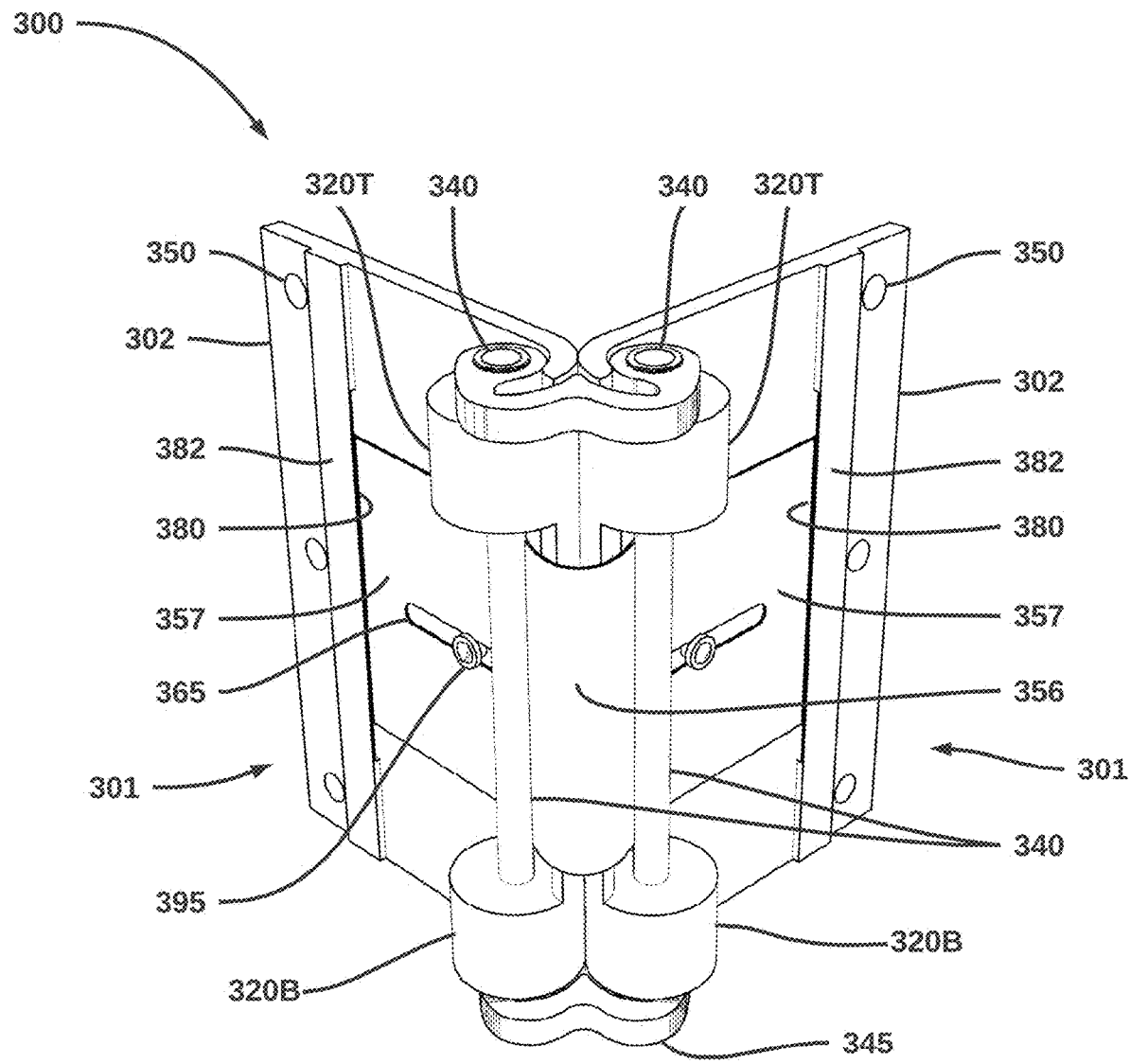
FIG. 3D is an exploded upper left perspective rear view thereof shown in a partially open configuration.
Figure 3E:
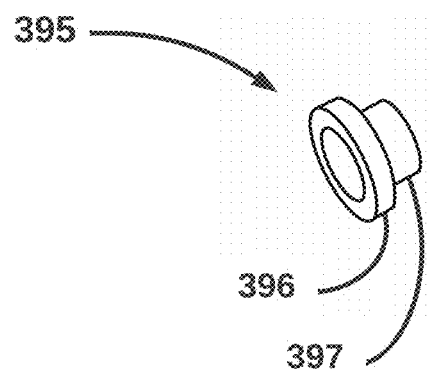
FIG. 3E is a perspective view of a fastener seen in FIG. 3D.

Referring now to FIGS. 3A-3B, a fourth embodiment of the invention 300 includes hinge members 301 having hinge leaves 302, knuckles 320T, 320B that include bores 330, pivot pins 340, and mounting holes 350 similar to the other embodiments discussed above. However, the fourth embodiment includes individual connector plates 377 disposed on the top of the top knuckles 320T and on the bottom of the bottom knuckles 320B to connect together the pivot pins 340 and hinge members 301. An optional coupler 370 can be inserted between the top and bottom knuckles 320T and 320B as can be seen with reference to FIG. 3A to further secure the pivot pins 340 in place and to hide the middle portion 356 of a leaf spring 355 discussed in more detail in the next embodiment.

The fourth embodiment has a leaf spring 355 instead of a helical spring. It will be understood that other resilient materials fall within the ambit of the invention and could be substituted in place of the leaf spring. A middle portion 356 of the leaf spring 355 is captured between the hinge members 301 and pivot pins 340. Outer portions 357 of the leaf spring 355 are slidingly captured in slots 380 formed between the hinge leaves 302 and retaining bars 382 fixed at their upper and lower ends to the hinge leaves. The leaf spring 355 biases the hinge members 301 from the open configuration shown in FIG. 3A to the closed configuration shown in FIG. 3B.

The outer portions 357 of the leaf spring 355 can be more securely fixed to the hinge leaves 302 by fasteners 395 each of which is attached to one of the hinge leaves as seen. Each fastener has a head 396 wider than the fastener body 397 leaving a space between the fastener head 396 and the surface of the hinge leaf 355. Slots 365 provided in the outer portions 357 have a width greater than fastener body 397 but less than the fastener head so that as the leaf spring 355 is bent between open and closed configurations the outer portions 357 thereof are retained and slide between the fastener head 396 and the hinge leaf 355. The length and position of the slot can be set to limit movement of the leaf spring and thus pivoting of the hinge members 301.

Figure 4A:
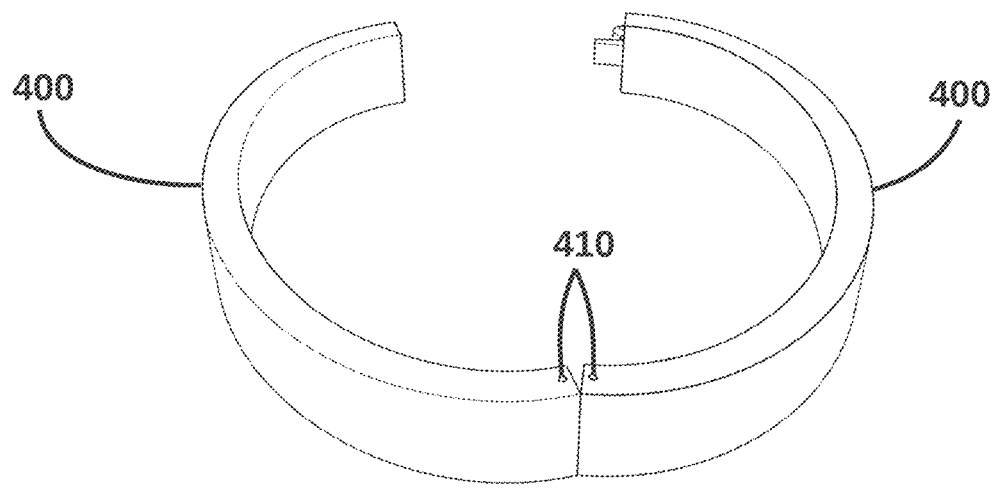
FIG. 4A is an upper perspective view of a bracelet using a dual axis hinge according to the invention.
Figure 4B:
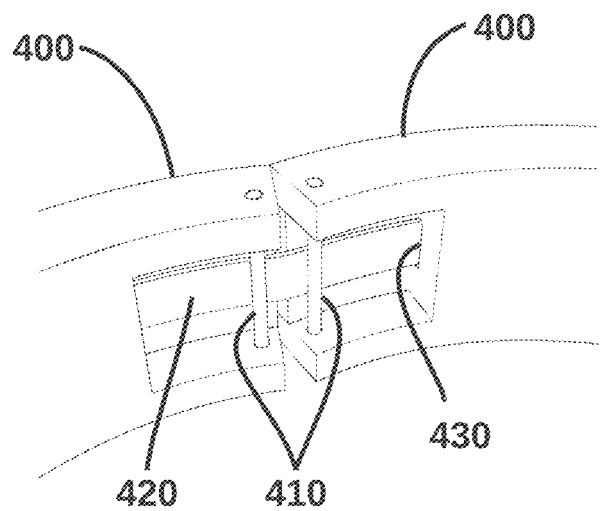
FIG. 4B is a close up upper rear perspective view of the hinge of the bracelet shown in FIG. 4A.

An exemplary use of a hinge having dual pivot axes is shown in FIGS. 4A and 4B which depict a bracelet 400 having a hinge with two pivot pins 410 that retain leaf spring 420 each end of which is inserted in a slot 430 provided in the body of the bracelet.

A hair claw clip 500 shown in FIGS. 5A and 5B using a hinge having dual pivot axes has a single seam 510 between the hinged halves 501 thereof. A coupler 530 hides the spring mechanism, which is easily seen in prior art hair clips, thereby presenting a more attractive hair piece in which only a single seam 510 is visible.

Figure 6:
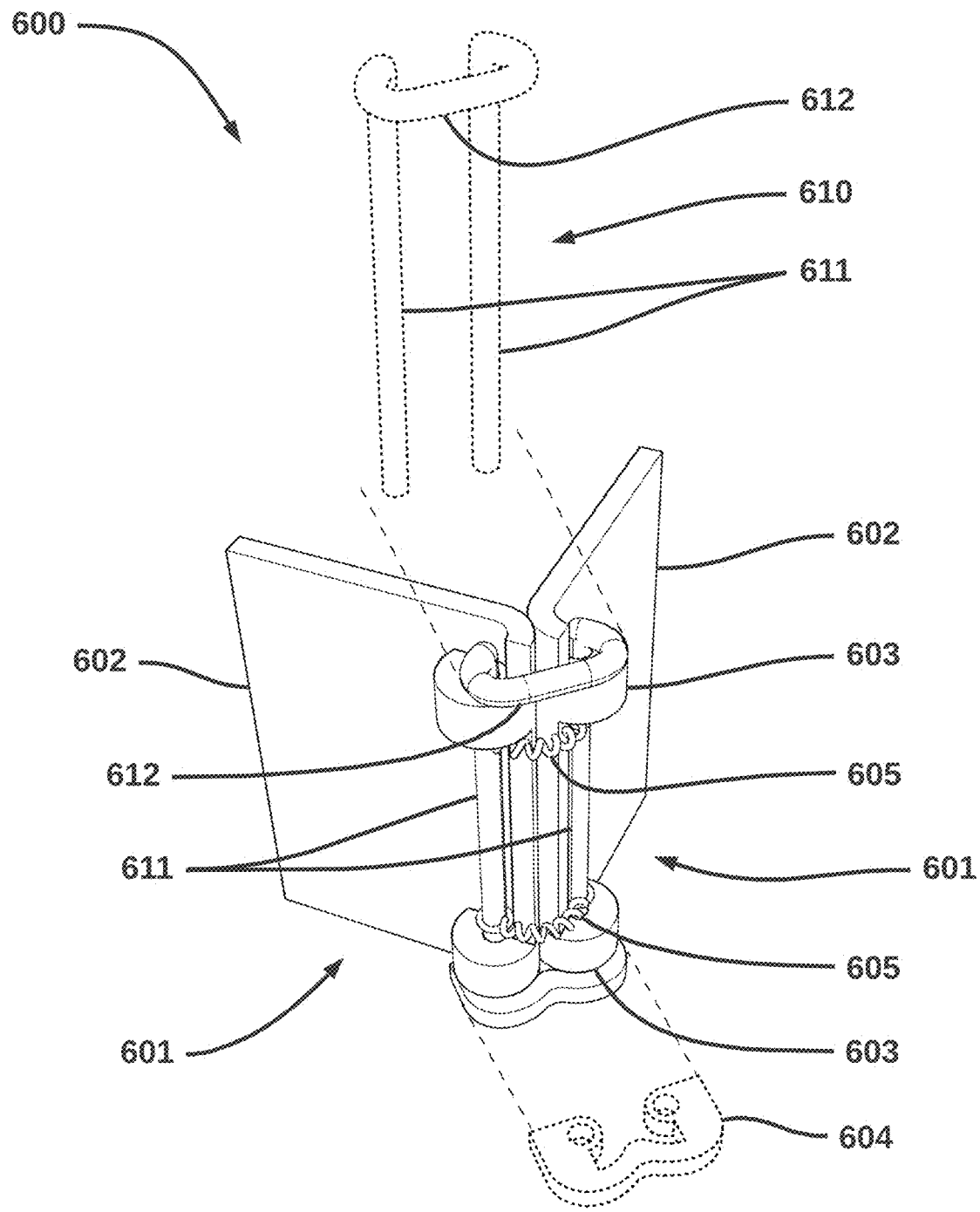
FIG. 6 is an exploded perspective view of another embodiment of a hinge having dual axes.

An alternate embodiment 600 of a hinge having dual pivot axes shown in FIG. 6 is similar to that shown in FIGS. 2A and 2B, having hinge members 601, hinge leaves 602, knuckles 603, a coupler plate 604, and springs 605, but instead of having two individual pivot pins it has a pin set 610 that includes two pivot pins 611 joined by bridge 612. A pin set as shown may facilitate the manufacturing process.

Figure 7:
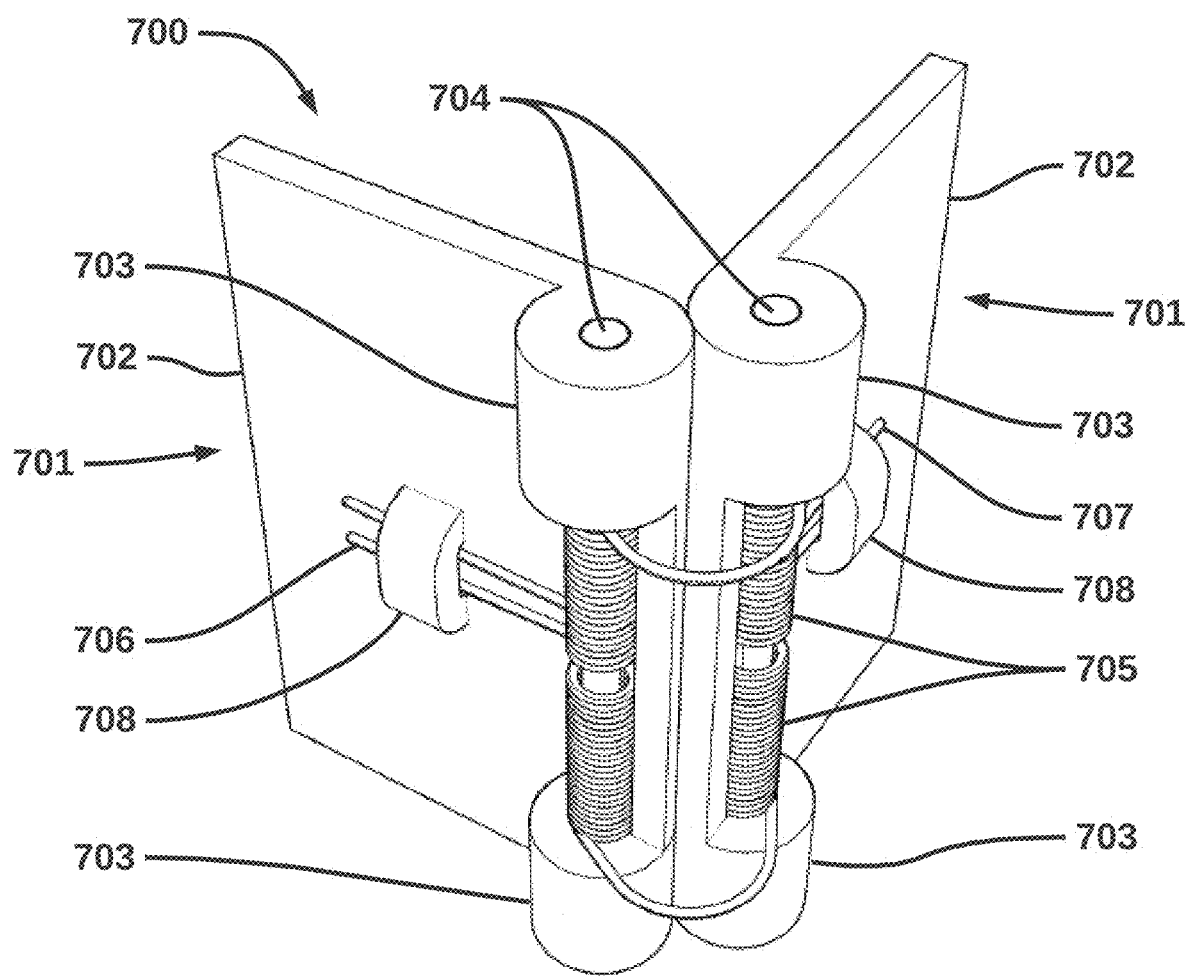
FIG. 7 is an upper perspective view of another embodiment thereof.

Another embodiment 700 of a hinge having dual pivot axes shown in FIG. 7 has hinge members 701, hinge leaves 702, knuckles 703, and pivot pins 704 similar to those elements discussed above but uses dual torsion springs 705 having first ends 706 and second ends 707 slidingly captured against the hinge leaves 702 by retaining bosses 708 to interconnect the hinge members 701 and bias them toward a closed position.

Figure 8A:
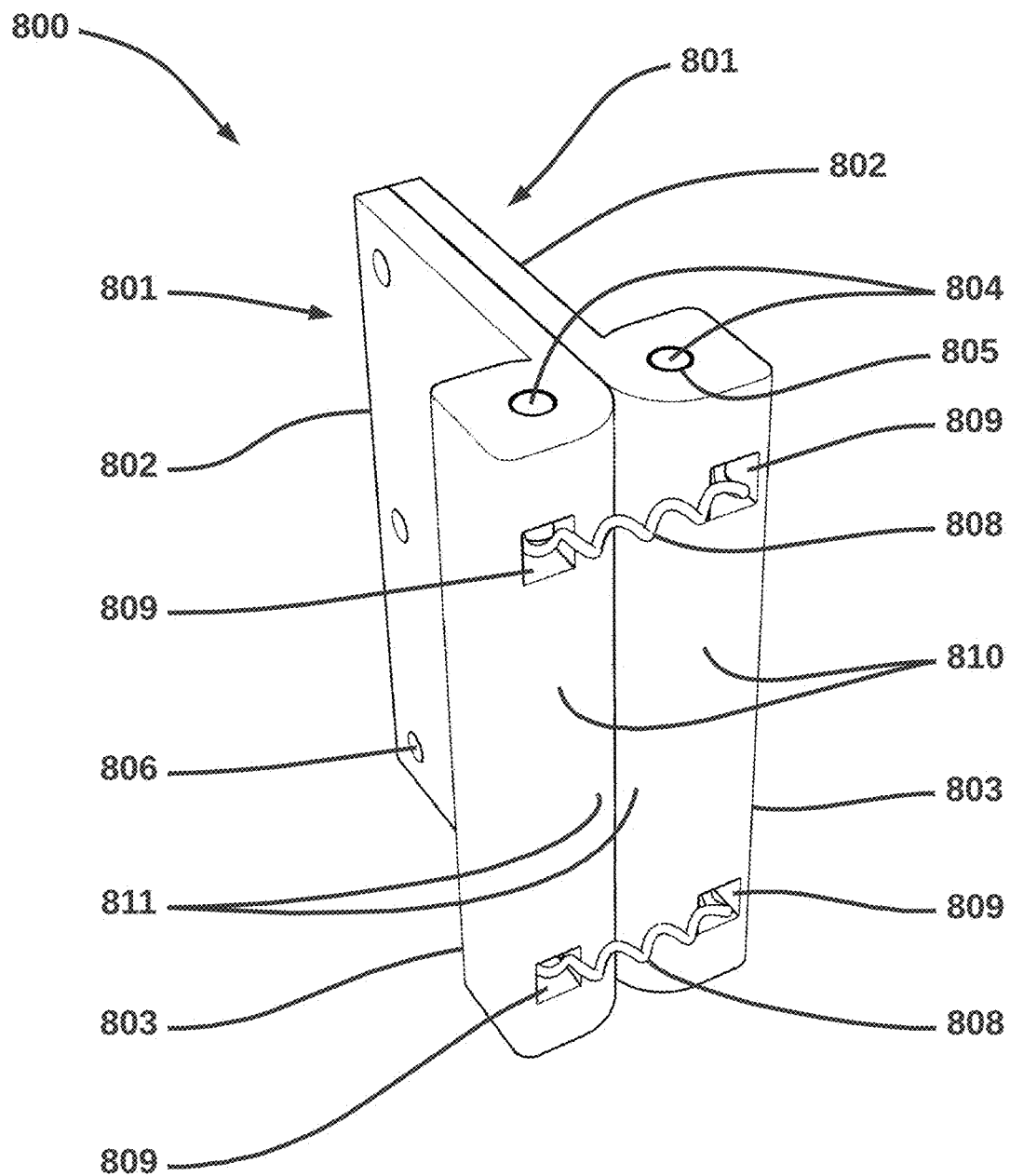
FIG. 8A is an upper rear perspective view of another embodiment thereof shown in an open configuration.
Figure 8B:
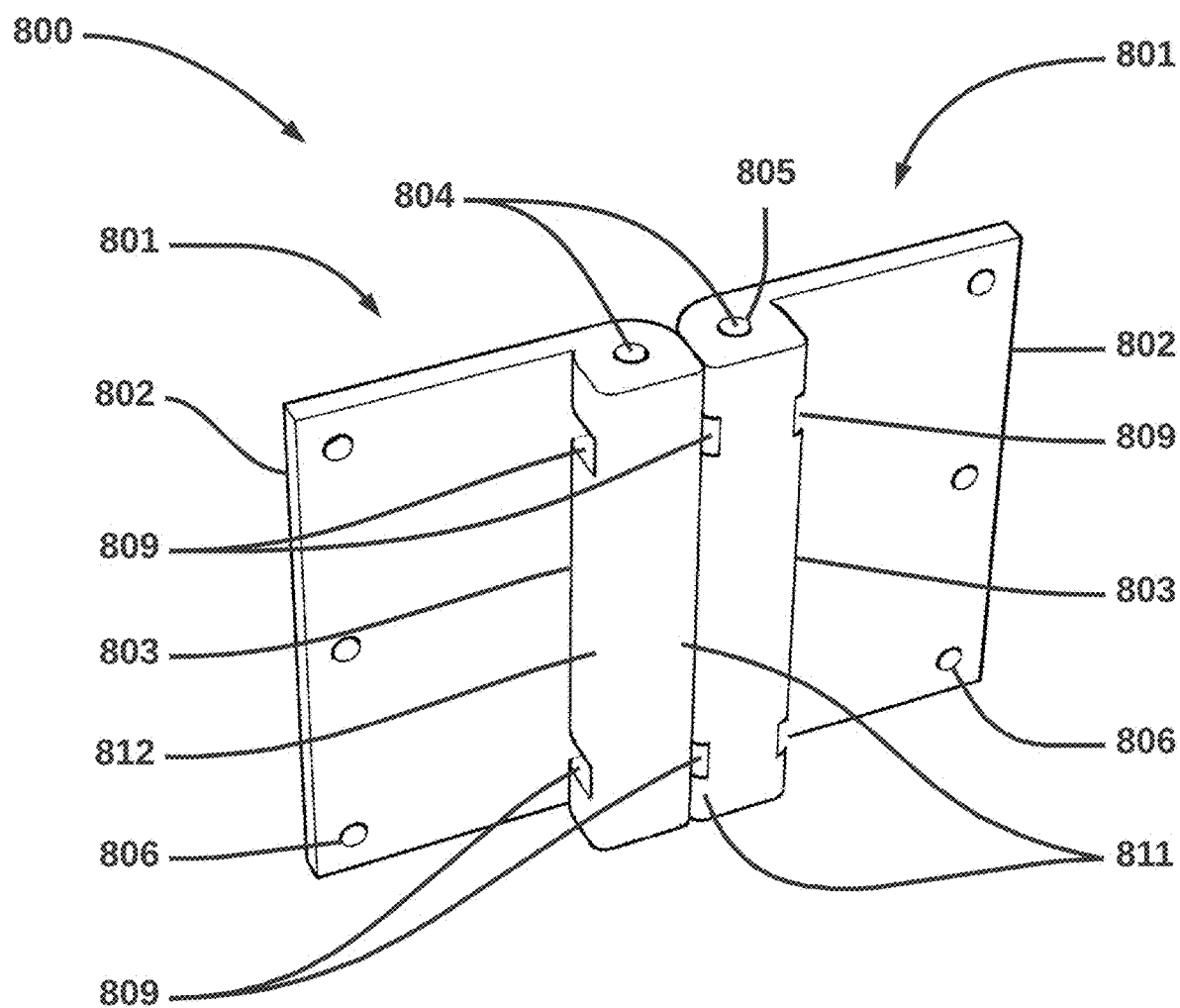
FIG. 8B is an upper rear perspective view thereof shown in a closed configuration.
Figure 8C:
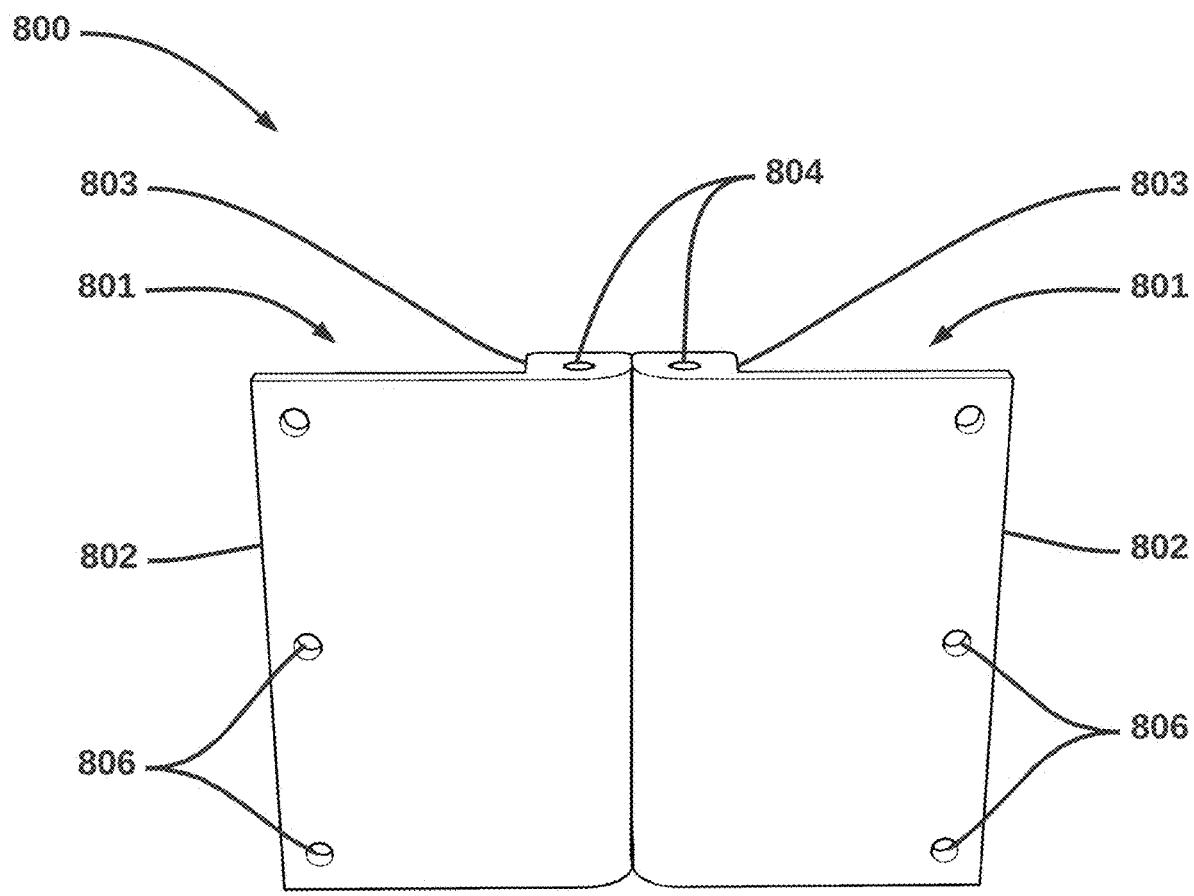
FIG. 8C is an upper front perspective view thereof shown in a closed configuration.
Figure 8D:
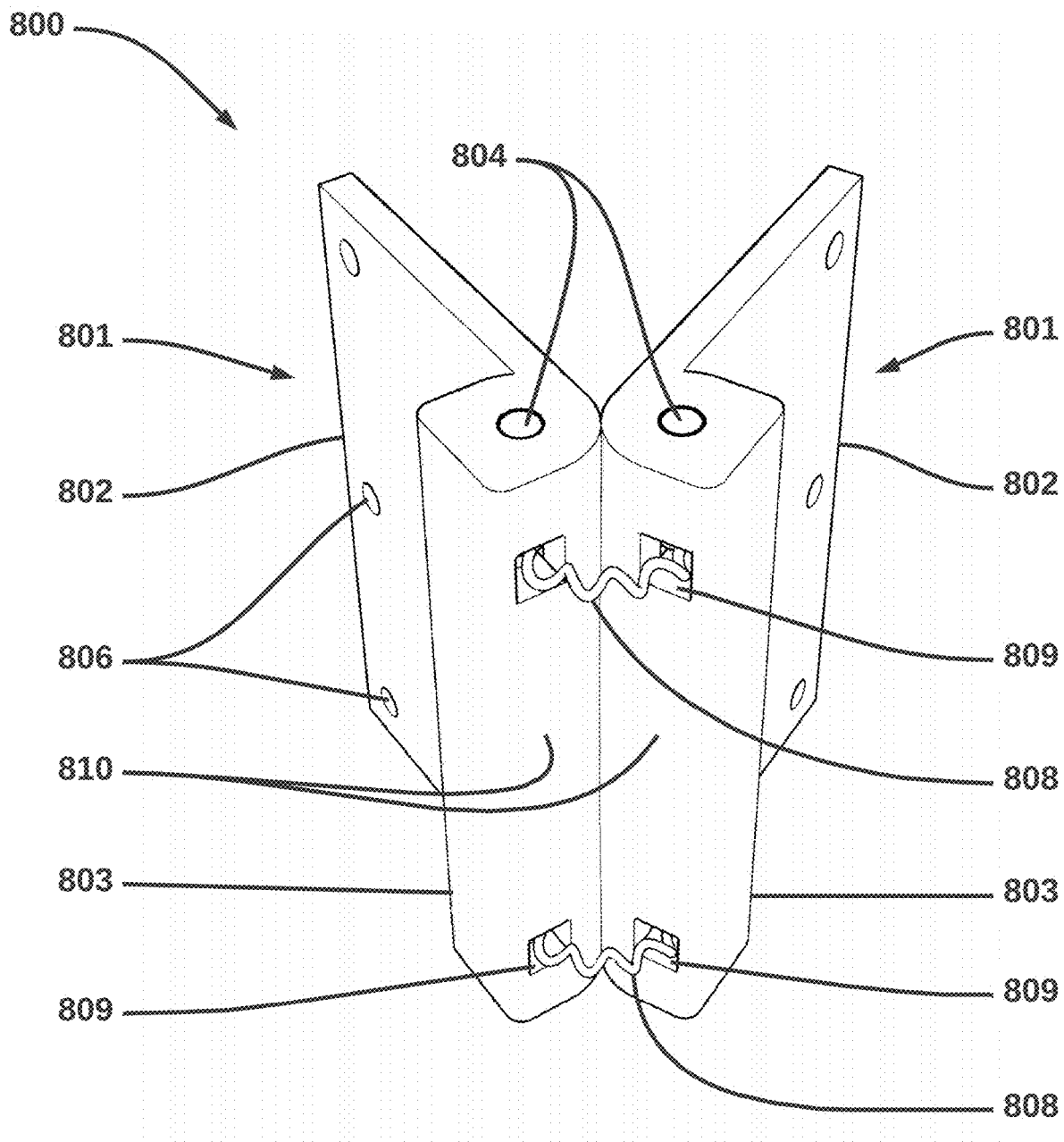
FIG. 8D is an upper rear perspective view thereof shown in a partly open configuration.
Figure 8E:
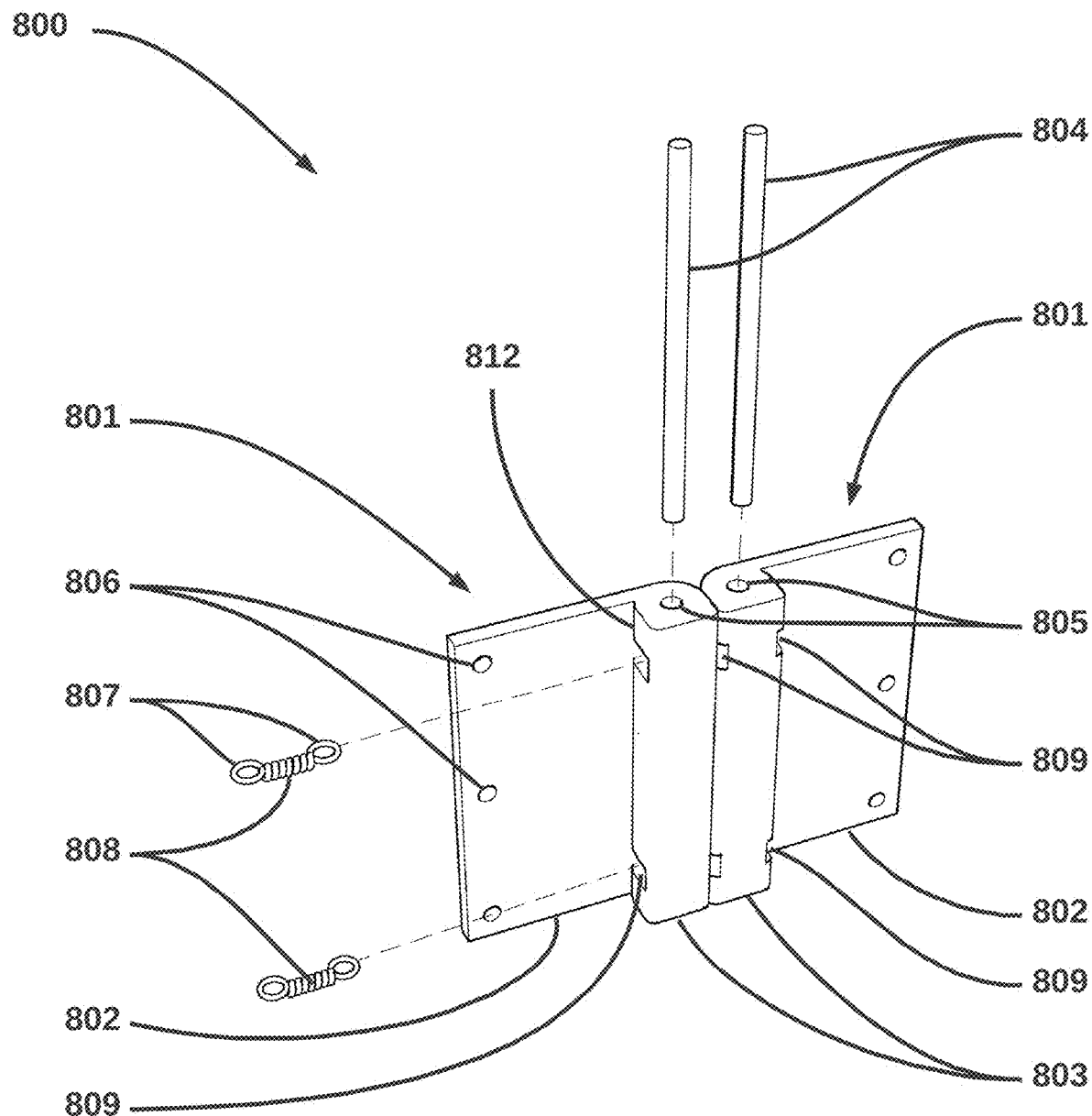
FIG. 8E is an exploded upper rear perspective view thereof.

Another embodiment 800 of the invention that omits the connector plates and connector, shown in FIGS. 8A-8E, has two hinge members 801 each including a hinge leaf 802 and a knuckle 803. In the illustrated embodiment, the knuckle 803 is seen to travel the full height of the hinge member but could be shorter. As seen in FIG. 8E, pivot pin 804 is inserted in bores 805 extending longitudinally through the knuckles 803. The hinge leaves 802 may include mounting holes 806 if needed.

Each end 807 of springs 808 is attached to and retained by one of the pivot pins 804, access to which is gained via apertures 809 in the body of knuckles 803 as seen. In the illustrated embodiment, each aperture 809 extends between abutment face 810 through knuckle 803 to the outer face 812 of knuckle 803, but in other embodiments it may not. Two springs 808 are shown in the illustrated embodiment, but one or more than two springs could be used. As the hinge members 802 are moved from a closed configuration as seen in FIG. 8B to an open configuration as seen in FIG. 8A, springs are tensioned and bias the hinge members toward the closed configuration in which abutment faces 810 of knuckles 803 are abutting. See also FIG. 8C. Rounded pivot corners 811 of knuckles 803 facilitate movement between the open and closed configurations.

A hinge having dual pivot axes according to the invention has several advantages over the prior art including hiding the spring mechanism, if used, from view while showing only a single seam between two hinge members, allowing the hinge members to open more than 180°, and allowing each hinge member to move independently of the other hinge member. A dual axis hinge has many possible applications including not only in hair accessories, but in doors, hinged panels, containers, and any other hinged article.

There have thus been described and illustrated certain embodiments of a hinge having dual axes according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

We claim:

1. A hinge having dual pivot axes, the hinge comprising:
    two hinge members, each hinge member having a hinge leaf and one or more knuckles, each of the one or more knuckles extending along an inner edge of the hinge leaf and having an axially extending bore, each of the one or more knuckles having an abutment face, each of the abutment faces having one or more apertures,
    two or more pivot pins,
    each one of the two or more pivot pins received in the bores of the one or more knuckles of one of the hinge members and received in one of the one or more apertures of each of the one or more knuckles, each pivot pin defining a pivot axis about which one of the hinge members pivots,
    closed and open configurations,
        in the closed configuration, the abutment face each of the one or more knuckles of each of the hinge members abutting the abutment face of one of the one or more knuckles of the other of the two hinge members, said abutment faces for stabilizing the hinge members in a desired disposition, and
        in the open configuration, said abutment faces of said knuckles separated, and
    one or more resilient bodies interconnecting the hinge members and biasing the hinge leaves toward their positions in the closed configuration,
    such that each of the knuckles thereof is disposed adjacent to another knuckle, and each of the hinge members is independently rotatable about the pivot axis of one of the two or more pivot pins thereby enabling the hinge leaves to pivot relative to one another between open and closed configurations.

2. The hinge of claim 1 further comprising:
    said one or more resilient bodies comprising one or more helical springs, each of the springs having two ends, and each end received in one of the one or more apertures of one of the knuckles of each of the two hinge members and affixed to one of the pivot pins.

3. The hinge of claim 1 further comprising:
    said two or more pivot pins connected by a bridge.

4. The hinge of claim 1 wherein each of said one or more apertures is disposed in the abutment face of one of the one or more knuckles of each of said two hinge members.

5. The hinge of claim 1 further comprising:
    two of said two or more pivot pins connected by a bridge, such that each of the hinge members is independently rotatable about the pivot axis of one of the two or more pivot pins.

6. The hinge of claim 1 wherein at last one of the one or more resilient bodies comprises a spring.

7. The hinge of claim 1 wherein the one or more resilient bodies are more tensed in the open configuration and less tensed in the closed configuration.

8. The hinge of claim 1 further comprising:
    each of the one or more knuckles having an outer face opposite the abutment face, and
    at least one of the one or more apertures of each of the one or more knuckles extending from the abutment face through the knuckle to the outer face.

9. A hinge comprising:
    two hinge members, each hinge member having a hinge leaf, one or more knuckles, and a pivot corner, each of the one or more knuckles extending along an inner edge of the hinge leaf and having an abutment face disposed angularly to the hinge leaf, the abutment face having one or more apertures, the pivot corner formed at an intersection of the abutment face and the hinge leaf,
    closed and open configurations,
        in the closed configuration, the abutment face each of the one or more knuckles of each of the hinge members abutting the abutment face of one of the one or more knuckles of the other of the two hinge members, said abutment faces for stabilizing the hinge members in a desired disposition, and
        in the open configuration, said abutment faces of said knuckles separated, and
    one or more resilient bodies, each of the one or more resilient bodies having opposite ends, each said end received in one of said one or more apertures and retained in one of the one or more knuckles of one of the two hinge members, the one or more resilient bodies thereby interconnecting the two hinge members,
    such that each of the one or more knuckles of each of the two hinge members is disposed adjacent to one of the one or more knuckles of the other of the two hinge members thereby enabling the two hinge members to pivot relative to each other about said pivot corners.

10. The hinge of claim 9 further comprising:

each the one or more knuckles having an axially extending bore, two or more pivot pins, each one of the two pivot pins received in the bores of the one or more knuckles of one of the hinge members, and each end of each of the one or more resilient bodies is attached to one of the pivot pins.

11. The hinge of claim 10 further comprising:

two of said two or more pivot pins connected by a bridge, such that each of the hinge members is independently rotatable about a pivot axis formed by one of the two or more pivot pins.

12. The hinge of claim 11 wherein the pivot corners of the one or more knuckles of the two hinge members are continuously engaged as the hinge members move between the open and closed configurations.

\* \* \* \* \*